(12) United States Patent
Kitamura

(10) Patent No.: US 11,267,223 B2
(45) Date of Patent: Mar. 8, 2022

(54) FLUORESCENT PLATE

(71) Applicant: Ushio Denki Kabushiki Kaisha, Tokyo (JP)

(72) Inventor: Seiji Kitamura, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 728 days.

(21) Appl. No.: 16/232,697

(22) Filed: Dec. 26, 2018

(65) Prior Publication Data

US 2019/0203057 A1 Jul. 4, 2019

(30) Foreign Application Priority Data

Dec. 28, 2017 (JP) .............................. JP2017-252920

(51) Int. Cl.
*B32B 7/12* (2006.01)
(52) U.S. Cl.
CPC ............ *B32B 7/12* (2013.01); *B32B 2255/20* (2013.01); *B32B 2255/205* (2013.01); *B32B 2255/28* (2013.01); *B32B 2307/422* (2013.01)
(58) Field of Classification Search
CPC . B32B 7/12; B32B 2255/20; B32B 2255/205; B32B 2255/28; B32B 2307/422
USPC ........................................................ 428/332
See application file for complete search history.

(56) References Cited

U.S. PATENT DOCUMENTS

2018/0080615 A1* 3/2018 Inoue ..................... C09K 11/00

FOREIGN PATENT DOCUMENTS

| JP | 2008-260978 A | 10/2008 | |
|---|---|---|---|
| JP | 2015-050124 A | 3/2015 | |
| WO | WO-2016158088 A1 * | 10/2016 | ............. C09K 11/00 |

* cited by examiner

*Primary Examiner* — Betelhem Shewareged
(74) *Attorney, Agent, or Firm* — Studebaker & Brackett PC

(57) ABSTRACT

Disclosed is a fluorescent plate in which a high reflectance of a reflective layer can be maintained over a long period of time, and occurrence of peeling of the reflective layer can be suppressed.

The fluorescent plate of the present invention includes a fluorescent material layer containing a fluorescent material, an oxide layer disposed below the fluorescent material layer, and a reflective layer which is disposed below the oxide layer and is formed of silver, and further includes an oxidation-preventive protective layer which is disposed between the oxide layer and the reflective layer and is formed of a translucent material, and a translucent adhesion layer interposed between the oxidation-preventive protective layer and the reflective layer.

17 Claims, 2 Drawing Sheets

FLUORESCENT PLATE

TECHNICAL FIELD

The present invention relates to fluorescent plates, and in particular, to a fluorescent plate in which an excitation light incident surface and a fluorescence emission surface are formed by the same surface.

BACKGROUND ART

Conventionally, as a kind of a fluorescent light source device, a reflection-type device has been known with a configuration in which the surface of a fluorescent plate having a fluorescent material layer is irradiated with laser light as excitation light to excite a fluorescent material constituting the fluorescent material layer, thereby emitting fluorescence from the surface.

In such a reflection-type fluorescent light source device, the fluorescent plate used is provided with a reflective layer formed of a metal such as aluminum, silver, or gold on the fluorescent material layer opposite to the side on which the excitation light is incident. (See, for example, Patent Literature 1.)

In the fluorescent plate of Patent Literature 1, in order to achieve high luminance, a total reflection film is provided between the fluorescent material layer and the reflective layer in a state in which the total reflection film is in direct contact with the fluorescent material layer. The total reflection film is formed of a material of which a refractive index is smaller than that of the constituent material of the fluorescent material layer and in which a refractive index difference from that of the constituent material of the fluorescent material layer is not less than 0.2. In this fluorescent plate, the total reflection film may be formed of, for example, magnesium fluoride ($MgF_2$). Between the fluorescent material layer and the reflective layer, specifically between the total reflection film and the reflective layer, a constitution layer made of a reflection enhancing film is laminated.

On the other hand, also in a reflection mirror used in an optical system such as a flat panel display or a projector, a reflective layer formed of a metal is formed on a resin substrate, and the reflective layer is made of silver having a high reflectance. (See, for example, Patent Literature 2.)

CITATION LIST

Patent Literature

Patent Literature 1: Japanese Patent Application Laid-Open No. 2015-50124
Patent Literature 2: Japanese Patent Application Laid-Open No. 2008-260978

SUMMARY OF INVENTION

Technical Problem

However, in the case where the reflective layer is made of silver in the fluorescent plate provided with the reflective layer, it has been revealed that various problems occur.

Specifically, there is a problem that the reflective layer is oxidized and deteriorates, and so the reflectance of the reflective layer is reduced. Through intensive research by the present inventors, it has been revealed that the problem becomes remarkable when the constitution layer formed of an oxide, that is, the oxide layer is in direct contact with the reflective layer in the fluorescent plate. There is also a problem that the reflective layer peels off. As specific examples of the oxide layer provided on the fluorescent plate, may be mentioned an oxide multilayer film functioning as a reflection enhancing film and an oxide monolayer film functioning as a moisture-proof film.

In order to solve the above problem, in the fluorescent plate, it has been proposed to provide an oxidation-preventive protective layer, which is formed of a translucent material of a nitride or a fluoride, between the reflective layer and the oxide layer composed of a reflection enhancing film or the like.

However, in the fluorescent plate in which the oxidation-preventive protective layer is disposed between the fluorescent material layer and the reflective layer, it has been revealed that peeling occurs at the interface between the oxidation-preventive protective layer and the reflective layer due to a temperature change in the use environment and a temperature change caused by use, specifically, a temperature change caused by repeated turning on and off of the fluorescent light source device.

The present invention has been made in view of the foregoing circumstances, and has as its object the provision of a fluorescent plate in which a high reflectance of a reflective layer can be maintained over a long period of time, and occurrence of peeling of the reflective layer can be suppressed.

Solving Means

The fluorescent plate of the present invention includes a fluorescent material layer containing a fluorescent material, an oxide layer disposed below the fluorescent material layer, and a reflective layer which is disposed below the oxide layer and is formed of silver, and further includes an oxidation-preventive protective layer which is disposed between the oxide layer and the reflective layer and is formed of a translucent material, and a translucent adhesion layer interposed between the oxidation-preventive protective layer and the reflective layer.

In the fluorescent plate of the present invention, the translucent material constituting the oxidation-preventive protective layer may preferably be formed of any of a fluoride and a nitride.

In the fluorescent plate of the present invention, the translucent adhesion layer may preferably be formed of at least one of hafnium oxide and zirconium oxide.

In the fluorescent plate of the present invention, the translucent adhesion layer may preferably have a thickness of 5 to 10 nm.

In the fluorescent plate of the present invention, the oxide layer may preferably be composed of at least any one of an oxide monolayer film formed of alumina and an oxide multilayer film composed of a first constitution layer formed of silicon dioxide and a second constitution layer formed of titania.

The fluorescent plate of the present invention may further preferably include an oxygen atom-free layer which is disposed below the reflective layer and is formed of an oxygen atom-free material containing no oxygen atom.

In the fluorescent plate of the present invention with this configuration, the oxygen atom-free material may preferably comprise any material selected from the group consisting of magnesium fluoride, silicon nitride, aluminum nitride, aluminum, chromium and nickel.

Advantageous Effects of Invention

In the fluorescent plate of the present invention, the oxide layer is provided between the fluorescent material layer and the reflective layer, and the oxidation-preventive protective layer is provided between the oxide layer and the reflective layer in a state in which the translucent adhesion layer is interposed between the oxidation-preventive protective layer and the reflective layer. Therefore, even when the reflective layer is formed of silver, high adhesiveness can be obtained between the fluorescent material layer and the reflective layer. Moreover, the adhesiveness can be maintained over a long period for repeated use. In addition, it is possible to prevent oxidative degradation of the reflective layer due to the provision of the oxide layer between the fluorescent material layer and the reflective layer.

Therefore, according to the fluorescent plate of the present invention, a high reflectance of the reflective layer can be maintained over a long period of time, and occurrence of peeling of the reflective layer can be suppressed.

DESCRIPTION OF EMBODIMENTS

A description will next be given of embodiments of the present invention.

A fluorescent plate of the present invention may preferably be used in a reflection-type fluorescent light source device in which an excitation light incident surface and a fluorescence emission surface are formed by the same surface.

Figure 1:
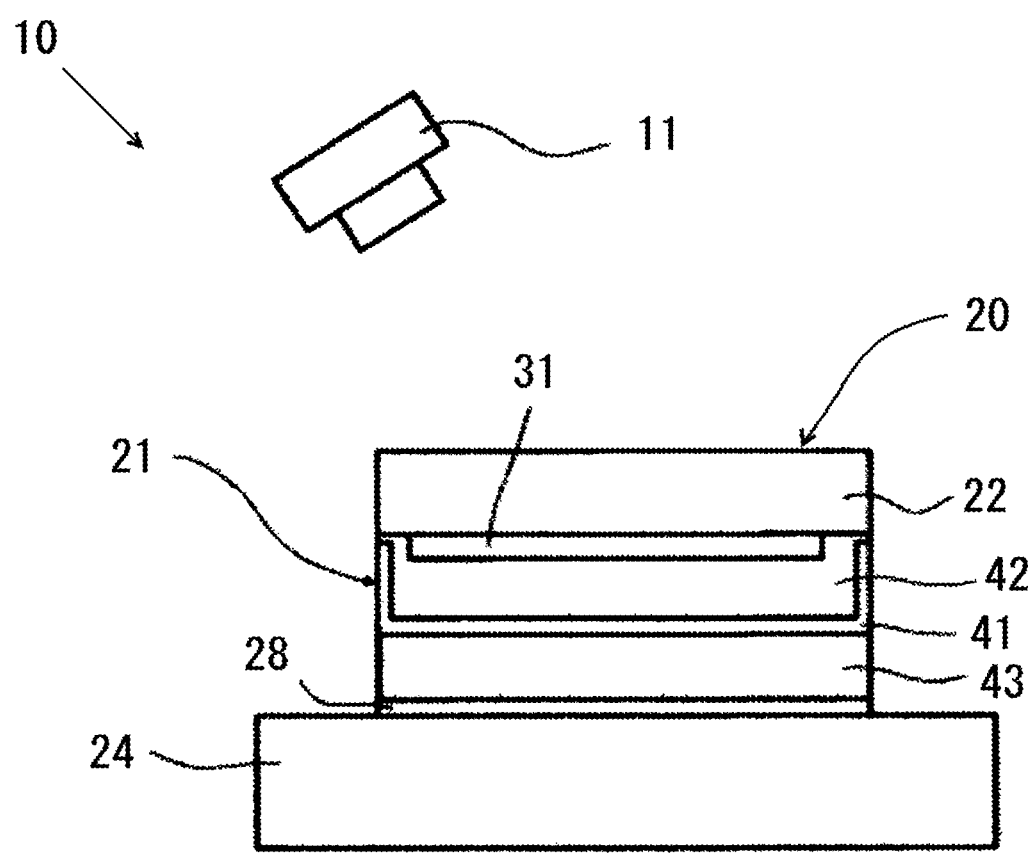
FIG. 1 is a schematic explanatory view illustrating an example of a configuration of a reflection-type fluorescent light source device provided with a fluorescent plate of the present invention.
Figure 2:
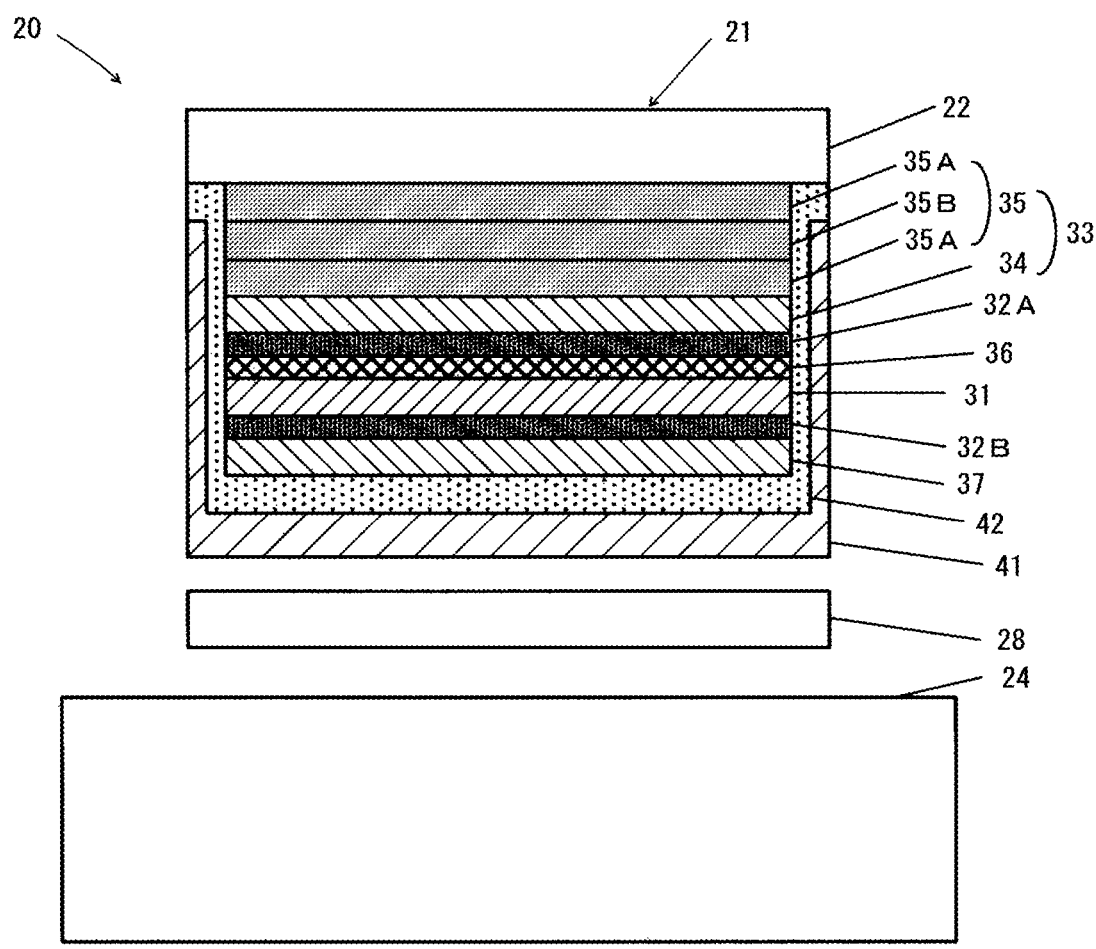
FIG. 2 is an explanatory exploded view illustrating a specific configuration of a light-emitting member in the fluorescent light source device of FIG. 1.

FIG. 1 is a schematic explanatory view illustrating an example of a configuration of a reflection-type fluorescent light source device provided with a fluorescent plate of the present invention, and FIG. 2 is an exploded view illustrating a specific configuration of a light-emitting member in the fluorescent light source device of FIG. 1.

As illustrated in FIG. 1, the fluorescent light source device 10 includes, for example, an excitation light source 11 including a semiconductor laser, and a light-emitting member 20 having a fluorescent plate 21 that emits fluorescence by excitation light from the excitation light source 11, and these members are disposed apart from each other.

In the example illustrated in the drawing, the light-emitting member 20 is disposed in a posture inclined with respect to the optical axis of the excitation light source 11 so as to face the excitation light source 11.

In the light-emitting member 20, the flat fluorescent plate 21 is disposed on the front surface (upper surface in FIG. 1) of a flat heat dissipation substrate 24, and a flat bonding member layer 28 is formed between the heat dissipation substrate 24 and the fluorescent plate 21. Thus, the fluorescent plate 21 and the heat dissipation substrate 24 are bonded to each other by the bonding member layer 28. The light-emitting member 20 is disposed such that the front surface (upper surface in FIG. 1) of the fluorescent plate 21 faces the excitation light source 11, and so the front surface of the fluorescent plate 21 serves as an excitation light incident surface and also as a fluorescence emission surface. That is, in the fluorescent plate 21, the excitation light incident surface and the fluorescence emission surface are formed by the same surface.

As illustrated in FIG. 2, the fluorescent plate 21 is formed by laminating a flat fluorescent material layer 22, a flat first oxide layer 33 and a flat reflective layer 31. In the fluorescent plate 21, the front surface (upper surface in FIG. 2) of the fluorescent material layer 22 constitutes the front surface of the fluorescent plate 21, that is, the excitation light incident surface and the fluorescence emission surface of the fluorescent plate 21. On the rear surface (lower surface in FIG. 2) side of the fluorescent material layer 22, the first oxide layer 33 and the reflective layer 31 are provided in this order. That is, on the rear surface side of the fluorescent material layer 22, the first oxide layer 33 is disposed below the fluorescent material layer 22, and the reflective layer 31 is disposed below the first oxide layer 33.

In the example illustrated in the drawing, the fluorescent plate 21 is provided on the rear surface side of the fluorescent material layer 22 with an adhesive layer 42 and a sealing layer 41 so as to cover the first oxide layer 33 and the reflective layer 31, and an oxidation-preventive protective layer 32A, a translucent adhesion layer 36, an oxygen atom-free layer 32B, and a second oxide layer 37, which will be described later. Specifically, a laminate (hereinafter also referred to as a "reflective laminate") is disposed on the rear surface of the fluorescent material layer 22, and in the laminate, the first oxide layer 33, the oxidation-preventive protective layer 32A, the translucent adhesion layer 36, the reflective layer 31, the oxygen atom-free layer 32B and the second oxide layer 37 are laminated in this order. The sealing layer 41 is provided in a state of being bonded to the reflective laminate and the fluorescent material layer 22 by the adhesive layer 42 so as to cover the reflective laminate. Thus, the fluorescent material layer 22, the adhesive layer 42 and the sealing layer 41 form a sealing structure of the reflective laminate.

The fluorescent material layer 22 contains a fluorescent material.

The fluorescent material layer 22 may preferably be formed of a polycrystal containing a fluorescent material, specifically, a mixed sintered body of a fluorescent material and a metal oxide such as alumina ($Al_2O_3$).

Since the fluorescent material layer 22 is formed of such a polycrystal, the fluorescent material layer 22 has high thermal conductivity.

As specific examples of the polycrystal constituting the fluorescent material layer 22, may be mentioned $Al_2O_3$/YAG:Ce, $Al_2O_3$/YAG:Pr, $Al_2O_3$/YAG:Sm and $Al_2O_3$/LuAG:Ce. In these polycrystalline fluorescent materials, the doping amount of a rare-earth element (activator) is about 0.5 mol %.

In the example illustrated in the drawing, the fluorescent material layer 22 is formed of a mixed sintered body (polycrystal) of a YAG-based fluorescent material and alumina.

The polycrystal constituting the fluorescent material layer 22 can be obtained by, for example, the following technique.

First, a raw material (specifically, a base material, an activator, a firing aid and a metal oxide such as alumina ($Al_2O_3$)) is pulverized by using a ball mill or the like to obtain a raw material fine powder in an order of submicron or less. Then, the resulting raw material fine powder is uniformly dispersed in an organic solvent to prepare a slurry.

A green sheet having a predetermined thickness is produced from the resulting slurry by a doctor blade method, and then, the green sheet is fired to obtain a sintered body. After that, the resulting sintered body is subjected to hot isostatic pressing to obtain a polycrystalline body having a porosity of not more than 0.5%.

The thickness of the fluorescent material layer 22 may preferably be 0.05 to 2.0 mm from the viewpoints of effective utilization of excitation light and heat dissipation.

In the example illustrated in the drawing, the thickness of the fluorescent material layer 22 is 0.1 mm.

The first oxide layer 33 is formed of an oxide and has transparency to excitation light and fluorescence.

The first oxide layer 33 may preferably be composed of at least any one of an oxide monolayer film (hereinafter referred to as a "specific monolayer film") 34 formed of alumina ($Al_2O_3$), and an oxide multilayer film (hereinafter referred to as a "specific multilayer film") 35 composed of a first constitution layer 35A formed of silicon dioxide ($SiO_2$), and a second constitution layer 35B formed of titania ($TiO_2$). That is, the first oxide layer 33 may preferably function as at least one of a moisture-proof layer and a reflection enhancing layer.

When the first oxide layer 33 has the specific monolayer film 34, since the specific monolayer film 34 has excellent weather resistance, the specific monolayer film 34 functions as a moisture-proof film. Therefore, it is possible to prevent or sufficiently suppress the front surface (upper surface in FIG. 2) of the reflective layer 31 from being exposed to moisture that has entered the interior of the fluorescent plate 21 via the constitution layers (specifically, the specific multilayer film 35 and the fluorescent material layer 22) laminated on the front surface side of the reflective layer 31. As a result, the silver constituting the reflective layer 31 can be prevented or sufficiently suppressed from reacting with water at the front surface of the reflective layer 31.

When the first oxide layer 33 has the specific multilayer film 35, since the specific multilayer film 35 functions as a reflection enhancing film, the reflectance of the fluorescent plate 21, specifically, the reflectance on the rear surface of the fluorescent material layer 22, can be increased. Thus, the fluorescent plate 21 has a higher reflection performance.

In the example illustrated in the drawing, the first oxide layer 33 is composed of the specific monolayer film 34 and the specific multilayer film 35. In the first oxide layer 33, the specific monolayer film 34 is disposed on the side closer to the reflective layer 31 (lower side in FIG. 2), and the specific multilayer film 35 is disposed on the side closer to the fluorescent material layer 22 (upper side in FIG. 2).

The thickness of the first oxide layer 33 is appropriately determined in accordance with the configuration of the first oxide layer 33.

Specifically, when the first oxide layer 33 is composed of the specific monolayer film 34, the thickness thereof is set to 5 to 15 nm, and when the first oxide layer 33 is composed of the specific multilayer film 35, the thickness thereof is set to 80 to 140 nm. When the first oxide layer 33 is composed of the specific monolayer film 34 and the specific multilayer film 35, the thickness thereof is set to 85 to 155 nm.

In the example illustrated in the drawing, the thickness of the first oxide layer 33 is 85 to 155 nm. Specifically, the thickness of the specific monolayer 34 is 5 to 15 nm, and the thickness of the specific monolayer 35 is 80 to 140 nm.

The reflective layer 31 is formed of silver. Specifically, the reflective layer 31 is formed of a silver reflective film or a silver alloy reflective film containing silver as a main component.

Since the reflective layer 31 is formed of silver, the fluorescent plate 21, specifically, the rear surface of the fluorescent material layer 22, has high reflectivity due to the silver with high reflectivity.

The thickness of reflective layer 31 is, for example, 110 to 350 nm.

The area of the front surface of the reflective layer 31 may preferably be not larger than the area of the rear surface of the fluorescent material layer 22 from the viewpoint of effective utilization of excitation light and fluorescence.

In the example illustrated in the drawing, the thickness of the reflective layer 31 is 130 nm. The front surface of the reflective layer 31 has a dimension slightly smaller than the dimension of the rear surface of the fluorescent material layer 22, and so the entire surface of the reflective layer 31 faces the central portion of the rear surface of the fluorescent material layer 22.

The fluorescent plate 21 is provided with the thin-film oxidation-preventive protective layer 32A and the thin-film translucent adhesion layer 36 between the first oxide layer 33 and the reflective layer 31. In this configuration, the oxidation-preventive protective layer 32A is disposed on the side closer to the first oxide layer 33, and the translucent adhesion layer 36 is disposed on the side closer to the reflective layer 31.

The oxidation-preventive protective layer 32A is formed of a translucent material and has transparency to excitation light and fluorescence. The oxidation-preventive protective layer 32A has a function of protecting the reflective layer 31 from oxidation. Specifically, the oxidation-preventive protective layer 32A does not transmit oxygen and release oxygen.

The provision of the oxidation-preventive protective layer 32A can prevent the generation of an oxide of silver at the reflective layer 31 formed of silver, specifically, the front surface of the reflective layer 31. Therefore, even when the fluorescent plate 21 has the first oxide layer 33, the front surface of the reflective layer 31 is not exposed to oxygen emitted from the first oxide layer 33 and oxygen that has entered the interior of the fluorescent plate 21 through the constitution layers (specifically, the fluorescent material layer 22 and the first oxide layer 33) laminated on the front surface side of the reflective layer 31. As a result, oxidative degradation of the reflective layer 31 can be prevented, and so a decrease in reflectance of the reflective layer 31 caused by oxidative degradation can be suppressed.

The translucent material constituting the oxidation-preventive protective layer 32A may preferably be a crystalline material other than an oxide, and specifically, may preferably be a nitride or a fluoride.

Since the translucent material constituting the oxidation-preventive protective layer 32A is a nitride or fluoride, generation of silver oxide in the reflective layer 31 formed of silver, specifically, the front surface of the reflective layer 31, can be prevented, and generation of a compound such as silver sulfide and silver hydroxide in the reflective layer 31 can also be prevented.

A description will now be given of the reason why the oxidation-preventive protective layer 32A formed of the translucent material of a nitride or fluoride can prevent generation of compounds such as silver sulfide, silver oxide and silver hydroxide in the reflective layer 31. As described above, the translucent material constituting the oxidation-preventive protective layer 32A may preferably be a material other than an oxide, and also preferably be a crystalline material, rather than an amorphous material. Since the translucent material is a material other than an oxide, the oxidation-preventive protective layer 32A does not release oxygen. In addition, the partial pressure of oxygen during the formation of the reflective layer 31 can be reduced, and so oxidation of the reflective layer 31 can be prevented. Further, if the translucent material is crystalline, the oxidation-preventive protective layer 32A becomes dense. Therefore, the oxidation-preventive protective layer 32A does not contain moisture thereinside, and can better prevent entry of oxygen, sulfur, water and the like from the outside, and diffusion of oxygen from the first oxide layer 33, and in particular, diffusion of water from the silicon dioxide ($SiO_2$) constituting the first constitution layer 35A into the reflective layer 31. As a result, since the oxidation-preventive protective layer 32A is formed of a translucent material which is a nitride or fluoride, the silver constituting the reflective layer 31 can be prevented from reacting with oxygen, sulfur, water or the like.

As examples of the nitride used as the translucent material constituting the oxidation-preventive protective layers 32A, may be mentioned metal nitrides such as aluminum nitride (AlN) and silicon nitride ($Si_3N_3$).

As examples of the fluoride used as the translucent material constituting the oxidation-preventive protective layer 32A, may be mentioned metal fluorides such as magnesium fluoride ($MgF_2$).

From the viewpoint of preventing oxygen release and preventing penetration of oxygen, sulfur, water and the like, the translucent material constituting the oxidation-preventive protective layer 32A may preferably be magnesium fluoride ($MgF_2$), silicon nitride ($Si_3N_4$) or aluminum nitride (AlN).

In the example illustrated in the drawing, the oxidation-preventive protective layer 32A is formed of magnesium fluoride ($MgF_2$).

The thickness of the oxidation-preventive protective layer 32A may preferably be 1 to 80 nm, more preferably 40 to 80 nm from the viewpoint of preventing oxidative degradation of the reflective layer 31 and of light transparency of the oxidation-preventive protective layer 32A (transparency to excitation light and fluorescence). When the thickness of the oxidation-preventive protective layer 32A is 40 to 80 nm, the silver constituting the reflective layer 31 can be prevented from reacting with oxygen, sulfur, water and the like.

The area of the rear surface (lower surface in FIG. 2) of the oxidation-preventive protective layer 32A may preferably be equal to the area of the front surface of the reflective layer 31 from the viewpoint of protecting the reflective layer 31.

In the example illustrated in the drawing, the thickness of the oxidation-preventive protective layer 32A is 40 nm. The rear surface of the oxidation-preventive protective layer 32A has a dimension equal to the dimension of the front surface of the reflective layer 31, and the oxidation-preventive protective layer 32A is disposed so as to cover the entire front surface of the reflective layer 31 via the translucent adhesion layer 36.

The translucent adhesion layer 36 is an intermediate layer interposed between the oxidation-preventive protective layer 32A and the reflective layer 31, and is provided in a state of being in direct contact with each of the oxidation-preventive protective layer 32A and the reflective layer 31. The translucent adhesion layer 36 has transparency to excitation light and fluorescence. The translucent adhesion layer 36 functions to adhere the oxidation-preventive protective layer 32A and the reflective layer 31 via the translucent adhesion layer 36 so that peeling does not occur between the oxidation-preventive protective layer 32A and the reflective layer 31, and to maintain the adhesiveness over a long period for repeated use.

The provision of the translucent adhesion layer 36 can obtain high adhesiveness between the fluorescent material layer 22 and the reflective layer 31, as well as sufficient durability for the adhesiveness. Thus, even when the fluorescent plate 21 is exposed to repeated temperature changes, occurrence of peeling between the fluorescent material layer 22 and the reflective layer 31 can be prevented or sufficiently suppressed.

More specifically, in the fluorescent plate 21 in which the first oxide layer 33 is provided between the fluorescent material layer 22 and the reflective layer 31, as described above, the provision of the oxidation-preventive protective layer 32A between the reflective layer 31 and the first oxide layer 33 can prevent oxidative degradation of the reflective layer 31. However, in the case where the oxidation-preventive protective layer is provided in direct contact with the reflective layer, peeling may occur at the interface between the oxidation-preventive protective layer and the reflective layer due to a temperature change of the use environment and a temperature change caused by repeated turning on and off of the fluorescent light source device. As illustrated in FIG. 2, the provision of the translucent adhesion layer 36 between the oxidation-preventive protective layer 32A and the reflective layer 31 can prevent or sufficiently suppress occurrence of peeling between the oxidation-preventive protective layer 32A and the reflective layer 31 due to exposure of the fluorescent plate 21 to repeated temperature changes. As a result, occurrence of peeling between the fluorescent material layer 22 and the reflective layer 31 can be prevented or sufficiently suppressed.

The translucent adhesion layer 36 may preferably be formed of a transition metal oxide of at least one of hafnium oxide ($HfO_2$) and zirconium oxide ($ZrO_2$), more preferably of hafnium oxide.

The formation of the translucent adhesion layer 36 with at least one of hafnium oxide ($HfO_2$) and zirconium oxide ($ZrO_2$) can provide a high reflectance (reflectance at the rear surface of the fluorescent material layer 22) as is apparent from the experimental examples described later. Further, even when the fluorescent plate 21 is exposed to repeated temperature changes, occurrence of peeling between the fluorescent material layer 22 and the reflective layer 31 can be prevented.

When the translucent adhesion layer 36 is formed of hafnium oxide, high manufacturing stability can be obtained. Specifically, the fluorescent plate 21 having a high reflectance without occurrence of peeling between the fluorescent material layer 22 and the reflective layer 31 can be stably manufactured.

When the translucent adhesion layer 36 is formed of at least one of hafnium oxide ($HfO_2$) and zirconium oxide ($ZrO_2$), which are metal oxides, the above-mentioned effects can be obtained without causing problems (specifically, a decrease in the reflectance of the reflective layer 31 and occurrence of peeling at the interface between the translucent adhesion layer 36 and the reflective layer 31) that occur when the oxide layer formed of the reflection enhancing film, the moisture-proof film and the like is in direct contact with the reflective layer. The availability of these effects has been first revealed by experiments conducted by the present inventors.

The thickness of the translucent adhesion layer 36 may preferably be small from the viewpoint of adhesiveness between the fluorescent material layer 22 and the reflective layer 31 and durability of the adhesiveness, and specifically, may preferably be 5 to 10 nm in consideration of light transparency and formation stability.

When the thickness of the translucent adhesion layer 36 is too small, the translucent adhesion layer 36 having a predetermined thickness may not be stably formed. Further, when the thickness of the translucent adhesion layer 36 is excessively large, there is a possibility that a sufficient reflectance, specifically, a reflectance on the rear surface of the fluorescent material layer 22 may not be obtained in the fluorescent plate 21.

The translucent adhesion layer 36 may be provided while being in contact with the rear surface of the oxidation-preventive protective layer 32A and the front surface of the reflective layer 31, or may be provided so as to cover part of the rear surface of the oxidation-preventive protective layer 32A and part of the front surface of the reflective layer 31. The oxidation-preventive protection layer 32A and the reflective layer 31 may be in a state in which parts of surfaces facing each other, specifically, part of the rear surface of the oxidation-preventive protective layer 32A and part of the front surface of the reflective layer 31 are in direct contact with each other. In such a case, since the thickness of the translucent adhesion layer 36 can be made extremely small and an anchor effect can be obtained, further excellent durability of adhesiveness and light transparency can be obtained.

The translucent adhesion layer 36 can be formed by a dry method such as a physical vapor deposition method.

As preferable specific examples of the physical vapor deposition method used for forming the translucent adhesion layer 36, may be mentioned an ion assisted electron beam evaporation method.

When the translucent adhesion layer 36 is formed by the ion assisted electron beam evaporation method, the translucent adhesion layer 36 can have high denseness and high adhesiveness to each of the oxidation-preventive protective layer 32A and the reflective layer 31.

The specific forming conditions of the translucent adhesion layer 36 are appropriately set in accordance with the material of the translucent adhesion layer 36 and the like.

In the fluorescent plate 21, an oxygen atom-free layer 32B formed of an oxygen atom-free material containing no oxygen atoms in the chemical formula expressing the composition may preferably be provided on the rear surface (lower surface in FIG. 2) of the reflective layer 31, as illustrated in FIG. 2.

When the oxygen atom-free layer 32B is provided, since the oxygen atom-free layer 32B does not release oxygen, oxidative degradation of the reflective layer 31 caused by the constitution layer disposed on the rear surface side of the reflective layer 31 can be prevented or sufficiently suppressed by appropriately selecting the type of the oxygen atom-free material constituting the oxygen atom-free layer 32B and the arrangement position of the oxygen atom-free layer 32B. That is, even if the fluorescent plate 21 is provided with the second oxide layer 37 on the rear surface side of the reflective layer 31, the oxidation of the reflective layer 31 caused by the provision of the second oxide layer 37 can be prevented or sufficiently suppressed by providing the oxygen atom-free layer 32B formed of an appropriate oxygen atom-free material between the reflective layer 31 and the second oxide layer 37.

The oxygen atom-free layer 32B may be transparent to excitation light and fluorescence, or may be non-transparent.

The oxygen atom-free material constituting the oxygen atom-free layer 32B may preferably comprise a fluoride, a nitride or metal.

Specifically, the oxygen atom-free material may preferably comprise any one substance selected from the group consisting of magnesium fluoride ($MgF_2$), silicon nitride ($Si_3N_4$), aluminum nitride (AlN), aluminum (Al), chromium (Cr) and nickel (Ni).

Since the oxygen atom-free material comprises any substance such as magnesium fluoride ($MgF_2$), silicon nitride ($Si_3N_4$), aluminum nitride (AlN), aluminum (Al), chromium (Cr) and nickel (Ni), the oxygen atom-free layer 32B does not release oxygen and does not transmit oxygen. Even if the fluorescent plate 21 has the second oxide layer 37 below the oxygen atom-free layer 32B, the rear surface of the reflective layer 31 is never exposed to oxygen released from the second oxide layer 37. As a result, oxidative degradation of the reflective layer 31 can be prevented.

The oxygen atom-free material may preferably comprise silicon nitride ($Si_3N_4$), aluminum nitride (AlN), aluminum (Al), chromium (Cr) and nickel (Ni) from the viewpoints of the adhesiveness between the oxygen atom-free layer 32B and the reflective layer 31 and the durability thereof.

In the example illustrated in the drawing, the oxygen atom-free layer 32B is formed of metallic chromium (Cr).

The thickness of the oxygen atom-free layer 32B may preferably be 1 to 30 nm.

The area of the front surface (upper surface in FIG. 2) of the oxygen atom-free layer 32B may preferably be equal to the area of the rear surface of the reflective layer 31 from the viewpoint of protecting the reflective layer 31.

In the example illustrated in the drawing, the front surface of the oxygen atom-free layer 32B has a dimension equal to the dimension of the rear surface of the reflective layer 31, and the oxygen atom-free layer 32B covers the entire rear surface of the reflective layer 31.

The second oxide layer 37 may preferably be formed of a metal oxide.

Specifically, the second oxide layer 37 may preferably be composed of a metal-oxide monolayer film (specific monolayer film) made of alumina ($Al_2O_3$).

When the second oxide layer 37 is composed of the specific monolayer film, since the specific monolayer film has excellent weather resistance, the specific monolayer film functions as a moisture-proof film. Thus, the rear surface of the reflective layer 31 can be prevented or sufficiently suppressed from being exposed to moisture. As a result, the silver constituting the reflective layer 31 can be prevented or sufficiently suppressed from reacting with water on the rear surface of the reflective layer 31.

In the example illustrated in the drawing, the second oxide layer 37 is composed of a metal-oxide monolayer film made of alumina ($Al_2O_3$).

The thickness of the second oxide layer 37 is appropriately determined in accordance with the material of the second oxide layer 37.

Specifically, when the second oxide layer 37 is composed of a metal-oxide monolayer film, that is, the material of the second oxide layer 37 is alumina, the thickness thereof is set to be 5 to 30 nm.

In the example illustrated in the drawing, the thickness of the second oxide layer 37 is 20 nm.

In the light-emitting member 20, the heat dissipation substrate 24 has a function of dissipating heat generated in the fluorescent plate 21, i.e., the fluorescent material layer 22.

As the constituent material of the heat dissipation substrate 24 used, may be mentioned metals such as copper (Cu) and an alloy of molybdenum and copper (Mo—Cu).

In the example illustrated in the drawing, the dissipation substrate 24 is formed of copper.

The thickness of the heat dissipation substrate 24 may be appropriately determined in consideration of the heat dissipation characteristics, and is, for example, 0.5 to 5.0 mm.

In addition, the area of the front surface of the heat dissipation substrate 24 is larger than the area of the rear surface of the fluorescent plate 21, as illustrated in FIGS. 1 and 2, from the viewpoint of heat dissipation performance and the like.

The heat dissipation substrate 24 may also have a function of a heat dissipation fin.

In the example illustrated in the drawing, the thickness of the heat dissipation substrate 24 is 0.5 to 4 mm.

From the viewpoint of the bonding property with the bonding member layer 28, a metal film in which an underlayer for adhesion and a solder wetting layer are laminated in this order may preferably be formed on the surface of the heat dissipation substrate 24.

In the example illustrated in the drawing, the entire outer surface (front surface, rear surface, and peripheral side surface) of the heat dissipation substrate 24 is covered with a metal film (not illustrated) formed of the underlayer for adhesion made of nickel and the solder wetting layer made of gold. The thickness of each layer constituting the metal film is 2.5 μm for the underlayer for adhesion and 0.03 μm for the solder wetting layer.

From the viewpoints of heat dissipation and low stress, a solder containing tin may preferably be used as the bonding member constituting the bonding member layer 28.

As specific examples of the tin-containing solder used as the bonding member, may be mentioned a gold-tin alloy (AuSn, a content ratio of tin (Sn) of 20% by mass, a thermal conductivity of 250 W/mK) and a tin-silver-copper alloy (a content ratio of Sn-3Ag-0.5Cu (silver (Ag)) of 3% by mass, a content ratio of copper (Cu) of 0.5% by mass, and a content ratio of tin (Sn) of 96.5% by mass), a thermal conductivity of 55 W/mK).

The thickness of the bonding member layer is, for example, 30 μm.

In the example illustrated in the drawing, as a bonding method of the fluorescent plate 21 and the heat dissipation substrate 24 by the bonding member, for example, a reflow method is used in which a reflow furnace is used, and a flux-free solder sheet (bonding member) is sandwiched between the fluorescent plate 21 and the heat dissipation substrate 24 and heated in an atmosphere of a formic acid gas or a hydrogen gas. According to the bonding method in which the surface oxide film of the flux-free solder sheet is removed by using the reducing power of formic acid or hydrogen to perform reflow, voids are not generated in the bonding member layer 28 to be formed, and favorable thermal conductivity can be obtained.

In the fluorescent light source device 10 having such a configuration, the excitation light emitted from the excitation light source 11 is irradiated onto the front surface (excitation light incident surface) of the fluorescent plate 21 in the light-emitting member 20, and enters the fluorescent plate 21. In the fluorescent plate 21, the fluorescent material constituting the fluorescent material layer 22 is excited. As a result, fluorescence is emitted from the fluorescent material in the fluorescent material layer 22. The fluorescence is emitted from the front surface (fluorescence emission surface) of the fluorescent plate 21 to the outside together with the excitation light reflected by the reflective layer 31 on the rear surface of the fluorescent material layer 22 without being absorbed by the fluorescent material, and is emitted to the outside of the fluorescent light source device 10.

In the fluorescent plate 21, the first oxide layer 33 is provided between the fluorescent material layer 22 and the reflective layer 31. The oxidation-preventive protective layer 32A is provided between the first oxide layer 33 and the reflective layer 31 in a state in which the translucent adhesion layer 36 is interposed between the oxidation-preventive protective layer 32A and the reflective layer 31.

Therefore, even if the reflective layer 31 is formed of silver having low adhesiveness to the fluorescent material layer 22, high adhesiveness can be obtained between the fluorescent material layer 22 and the reflective layer 31. Moreover, the adhesiveness can be maintained over a long period for repeated use. Therefore, even when the fluorescent plate 21 is exposed to repeated temperature changes due to a temperature change of the use environment of the fluorescent light source device 10, and a temperature change caused by repeated turning on and off of the fluorescent light source device 10, occurrence of peeling between the fluorescent material layer 22 and the reflective layer 31 is prevented or sufficiently suppressed.

Since the oxidation-preventive protective layer 32A is disposed between the first oxide layer 33 and the reflective layer 31, even when the fluorescent plate 21 has the first oxide layer 33, oxidative degradation of the reflective layer 31 due to the provision of the first oxide layer 33 can be prevented.

According to the fluorescent plate 21, a high reflectance can thus be obtained in the reflective layer 31 over a long period of time, and occurrence of peeling of the reflective layer 31 can be suppressed.

In the fluorescent plate 21, the first oxide layer 33 is composed of the specific monolayer film 34 and the specific multilayer film 35. Therefore, the surface of the reflective layer 31 can be prevented or sufficiently suppressed from being exposed to moisture, and the fluorescent plate 21 has further excellent high reflection performance.

In the fluorescent plate 21, the oxygen atom-free layer 32B is provided on the rear surface of the reflective layer 31, and the oxygen atom-free layer 32B is disposed between the reflective layer 31 and the second oxide layer 37. Thus, oxidative degradation of the reflective layer 31 due to the provision of the second oxide layer 37 can be prevented.

The fluorescent plate of the present invention has been described using a specific example as above, but the fluorescent plate of the present invention is not limited thereto.

For example, the fluorescent plate may have a periodic structure, in which a plurality of convex portions are periodically arranged, on the front surface of the fluorescent plate. Here, the periodic structure of the front surface of the fluorescent plate is, for example, a two-dimensional periodic arrangement in which convex portions having a substantially conical shape (specifically, a conical shape or a truncated conical shape) are densely arranged. When the fluorescent plate has a periodic structure on its front surface, it is preferable that the fluorescent plate has a periodic structure layer, having transparency to excitation light and fluorescence, laminated on the front surface of the fluorescent material layer from the viewpoint of ease of manufacturing.

A description will next be given of experimental examples of the present invention.

Experimental Example 1

An experimental laminate (hereinafter also referred to as "experimental laminate (1A)") was produced in which a fluorescent material layer, an oxide layer formed of an oxide multilayer film (reflection enhancing film) in which a silicon dioxide ($SiO_2$) layer and a titania ($TiO_2$) layer were laminated, an oxidation-preventive protective layer formed of magnesium fluoride ($MgF_2$), an adhesive layer formed of zirconium oxide ($ZrO_2$), and a reflective layer formed of silver were laminated in this order.

The specifications of the produced experimental laminate (1A) are as follows.

In this experimental laminate (1A), the oxide layer (reflection enhancing film) has a structure in which a silicon dioxide layer having a thickness of 5 nm, a titania layer having a thickness of 10 nm, a silicon dioxide layer having a thickness of 40 nm, and a titania layer having a thickness of 80 nm are laminated in this order on the rear surface of the fluorescent material layer.

[Fluorescent material layer]
  Thickness: 0.1 mm
[Oxidation-preventive protective layer]
  Material (translucent material): magnesium fluoride ($MgF_2$)
  Thickness: 40 nm
[Adhesion layer]
  Material: zirconium oxide ($ZrO_2$)
  Thickness: 5 nm
[Reflective layer]
  Material: silver (Ag)
  Thickness: 120 nm An experimental laminate (hereinafter also referred to as "experimental laminate (1B)") having the same structure as that of the experimental laminate (1A) was produced except that a diffusion plate was provided instead of the fluorescent material layer in the experimental laminate (1A).

That is, the experimental laminate (1B) has a structure in which an oxide layer formed of an oxide multilayer film (reflection enhancing film) in which a silicon dioxide ($SiO_2$) layer and a titania ($TiO_2$) layer were laminated, an oxidation-preventive protective layer formed of magnesium fluoride ($MgF_2$), an adhesive layer formed of zirconium oxide ($ZrO_2$), and a reflective layer formed of silver were laminated in this order.

Using the produced experimental laminates, a reflectance evaluation test, an adhesiveness evaluation test, and a luminous flux maintenance evaluation test were performed. The experimental laminate (1B) was used for the reflectance evaluation test, and the experimental laminate (1A) was used for the adhesiveness evaluation test and the luminous flux maintenance evaluation test. The results are shown in Table 1 below.

Specific procedures of the reflectance evaluation test, the adhesiveness evaluation test, and the luminous flux maintenance evaluation test are as follows.

[Reflectance Evaluation Test]

Light containing light having a wavelength of 430 to 670 nm was irradiated onto the front surface (front surface of the diffusion plate) of the experimental laminate (1B), and the reflectance (average reflectance) of light having a wavelength of 430 to 670 nm was measured. On the basis of obtained reflectance, the case where the reflectance is not less than 80% is evaluated as "1" for obtaining extremely favorable reflectance in the reflective layer, the case where the reflectance is greater than 75% and less than 80% is evaluated as "2" for obtaining favorable reflectance in the reflective layer, and the case where the reflectance is not greater than 75% is evaluated as "3" for not obtaining favorable reflectance in the reflective layer.

[Adhesiveness Evaluation Test]

The experimental laminate (1A) was subjected to a heating cycle for 1000 times including a heating operation under the condition of a set temperature of 85° C. and then a cooling operation under the condition of a set temperature of −40° C. After that, the front surface (fluorescent material layer) of the experimental laminate (1A) was irradiated with a laser beam of 100 W focused so that the diameter of the focused spot was 1.5 mm. Whether or not peeling occurred between the fluorescent material layer and the reflective layer was confirmed, and the case where peeling did not occur was evaluated as "1" for obtaining favorable adhesiveness (durability of adhesiveness) between the fluorescent material layer and the reflective layer, and the case where peeling occurred was evaluated as "3" for not obtaining favorable adhesiveness (durability of adhesiveness).

[Luminous Flux Maintenance Evaluation Test]

The front surface (fluorescent material layer) of the experimental laminate (1A) was irradiated with a laser beam of 100 W focused so that the diameter of the focused spot was 1.5 mm. The luminous flux (initial luminous flux) of the fluorescence emitted from the front surface of the experimental laminate (1A) immediately after the irradiation of the laser beam was measured. The luminous flux of the fluorescence emitted from the front surface of the experimental laminate (1A) (hereinafter also referred to as "luminous flux after 1000 hours") was also measured 1000 hours after the laser beam irradiation was started. From the obtained initial luminous flux and the 1000-hour elapsed luminous flux, a luminous flux maintenance ratio, which is a ratio of the 1000-hour elapsed luminous flux to the initial luminous flux, was calculated. The case where the luminous flux maintenance ratio is not less than 98% is evaluated as "1" for obtaining an extremely favorable luminous flux maintenance ratio, the case where the luminous flux maintenance ratio exceeds 95% and is less than 98% is evaluated as "2" for obtaining a favorable luminous flux maintenance ratio, and the case where the luminous flux maintenance ratio is not greater than 95% is evaluated as "3" for not obtaining a favorable luminous flux maintenance ratio.

Experimental Example 2

An experimental laminate (hereinafter also referred to as "experimental laminate (2A)") having the same structure as that of the experimental laminate (1A) was produced except that the thickness of the adhesion layer was 10 nm in the experimental laminate (1A) of Experimental Example 1.

An experimental laminate (hereinafter also referred to as "experimental laminate (2B)") having the same structure as that of the experimental laminate (2A) was produced except that the fluorescent material layer was not provided in the experimental laminate (2A).

Using the produced experimental laminates, evaluation tests were conducted in the same manner as in Experimental Example 1. The results are shown in Table 1.

Experimental Example 3

An experimental laminate (hereinafter also referred to as "experimental laminate (3A)") having the same structure as that of the experimental laminate (1A) was produced except that the thickness of the adhesion layer was 15 nm in the experimental laminate (1A) of Experimental Example 1.

An experimental laminate (hereinafter also referred to as "experimental laminate (3B)") having the same structure as that of the experimental laminate (3A) was produced except that a diffusion plate was provided instead of the fluorescent material layer in the experimental laminate (3A).

Using the produced experimental laminates, evaluation tests were conducted in the same manner as in Experimental Example 1. The results are shown in Table 1.

Experimental Example 4

An experimental laminate (hereinafter also referred to as "experimental laminate (4A)") having the same structure as that of the experimental laminate (1A) was produced except that the adhesion layer was formed of hafnium oxide in the experimental laminate (1A) of Experimental Example 1.

An experimental laminate (hereinafter also referred to as "experimental laminate (4B)") having the same structure as that of the experimental laminate (4A) was produced except that a diffusion plate was provided instead of the fluorescent material layer in the experimental laminate (4A).

Using the produced experimental laminates, evaluation tests were conducted in the same manner as in Experimental Example 1. The results are shown in Table 1.

Experimental Example 5

An experimental laminate (hereinafter also referred to as "experimental laminate (5A)") having the same structure as that of the experimental laminate (4A) was produced except that the thickness of the adhesion layer was 10 nm in the experimental laminate (4A) of Experimental Example 4.

An experimental laminate (hereinafter also referred to as "experimental laminate (5B)") having the same structure as that of the experimental laminate (5A) was produced except that a diffusion plate was provided instead of the fluorescent material layer in the experimental laminate (5A).

Using the produced experimental laminates, evaluation tests were conducted in the same manner as in Experimental Example 1. The results are shown in Table 1.

Experimental Example 6

An experimental laminate (hereinafter also referred to as "experimental laminate (6A)") having the same structure as that of the experimental laminate (4A) was produced except that the thickness of the adhesion layer was 15 nm in the experimental laminate (4A) of Experimental Example 4.

An experimental laminate (hereinafter also referred to as "experimental laminate (6B)") having the same structure as that of the experimental laminate (6A) was produced except that a diffusion plate was provided instead of the fluorescent material layer in the experimental laminate (6A).

Using the produced experimental laminates, evaluation tests were conducted in the same manner as in Experimental Example 1. The results are shown in Table 1.

Comparative Experimental Example 1

A comparative experimental laminate (hereinafter also referred to as "comparative experimental laminate (1A)") having the same structure as that of the experimental laminate (1A) was produced except that the oxidation-preventive protective layer and the adhesion layer were not provided in the experimental laminate (1A) of Experimental Example 1.

That is, the comparative experimental laminate (1A) had a structure in which the fluorescent material layer, the oxide layer and the reflective layer were laminated in this order.

A comparative experimental laminate (hereinafter also referred to as "comparative experimental laminate (1B)") having the same structure as that of the comparative experimental laminate (1A) was produced except that a diffusion plate was provided instead of the fluorescent material layer in the comparative experimental laminate (1A).

Using the produced comparative experimental laminates, evaluation tests were conducted in the same manner as in Experimental Example 1. The results are shown in Table 1.

Comparative Experimental Example 2

A comparative experimental laminate (hereinafter also referred to as "comparative experimental laminate (2A)") having the same structure as that of the experimental laminate (1A) was produced except that the adhesion layer was not provided and the thickness of the oxidation-preventive protective layer was 10 nm in the experimental laminate (1A) of Experimental Example 1.

That is, the comparative experimental laminate (2A) had a structure in which the fluorescent material layer, the oxide layer, the oxidation-preventive protective layer and the reflective layer were laminated in this order.

A comparative experimental laminate (hereinafter also referred to as "comparative experimental laminate (2B)") having the same structure as that of the comparative experimental laminate (2A) was produced except that a diffusion plate was provided instead of the fluorescent material layer in the comparative experimental laminate (2A).

Using the produced comparative experimental laminates, evaluation tests were conducted in the same manner as in Experimental Example 1. The results are shown in Table 1.

Comparative Experimental Example 3

A comparative experimental laminate (hereinafter also referred to as "comparative experimental laminate (3A)") having the same structure as that of the experimental laminate (1A) was produced except that the adhesion layer was not provided in the experimental laminate (1A) of Experimental Example 1.

That is, the comparative experimental laminate (3A) had a structure in which the fluorescent material layer, the oxide layer, the oxidation-preventive protective layer and the reflective layer were laminated in this order.

A comparative experimental laminate (hereinafter also referred to as "comparative experimental laminate (3B)") having the same structure as that of the comparative experimental laminate (3A) was produced except that a diffusion plate was provided instead of the fluorescent material layer in the comparative experimental laminate (3A).

Using the produced comparative experimental laminates, evaluation tests were conducted in the same manner as in Experimental Example 1. The results are shown in Table 1.

Comparative Experimental Example 4

A comparative experimental laminate (hereinafter also referred to as "comparative experimental laminate (4A)") having the same structure as that of the experimental laminate (1A) was produced except that a titanium layer with a thickness of 3 nm was provided as the adhesion layer in the experimental laminate (1A) of Experimental Example 1.

That is, the comparative experimental laminate (4A) had a structure in which the fluorescent material layer, the oxide layer, the oxidation-preventive protective layer, the adhesion layer (titanium layer) and the reflective layer were laminated in this order.

A comparative experimental laminate (hereinafter also referred to as "comparative experimental laminate (4B)") having the same structure as that of the comparative experimental laminate (4A) was produced except that a diffusion plate was provided instead of the fluorescent material layer in the comparative experimental laminate (4A).

Using the produced comparative experimental laminates, evaluation tests were conducted in the same manner as in Experimental Example 1. The results are shown in Table 1.

REFERENCE SIGNS LIST 10 fluorescent light source device
11 excitation light source
20 light-emitting member
21 fluorescent plate
22 fluorescent material layer
24 heat dissipation substrate
28 bonding member layer
31 reflective layer
32A oxidation-preventive protective layer
32B oxygen atom-free layer
33 first oxide layer
34 oxide monolayer film (specific monolayer film)
35 oxide multilayer film (specific multilayer film)
35A first constitution layer

TABLE 1

| | Constitution layer between oxide layer and reflective layer | | | | Evaluation | | |
|---|---|---|---|---|---|---|---|
| | Oxidation-preventive protective layer | | Adhesion Layer | | | | Luminous flux maintenance |
| | Material | Thickness | Material | Thickness | Reflectance | Adhesiveness | ratio |
| Experimental Example 1 | $MgF_2$ | 40 nm | $ZrO_2$ | 5 nm | 1 | 1 | 1 |
| Experimental Example 2 | $MgF_2$ | 40 nm | $ZrO_2$ | 10 nm | 1 | 1 | 1 |
| Experimental Example 3 | $MgF_2$ | 40 nm | $ZrO_2$ | 15 nm | 2 | 1 | 1 |
| Experimental Example 4 | $MgF_2$ | 40 nm | $HfO_2$ | 5 nm | 1 | 1 | 1 |
| Experimental Example 5 | $MgF_2$ | 40 nm | $HfO_2$ | 10 nm | 1 | 1 | 1 |
| Experimental Example 6 | $MgF_2$ | 40 nm | $HfO_2$ | 15 nm | 2 | 1 | 1 |
| Comparative Experimental Example 1 | — | — | — | — | 2 | 1 | 3 |
| Comparative Experimental Example 2 | $MgF_2$ | 10 nm | — | — | 1 | 3 | 1 |
| Comparative Experimental Example 3 | $MgF_2$ | 40 nm | — | — | 1 | 3 | 1 |
| Comparative Experimental Example 1 | $MgF_2$ | 40 nm | Ti | 3 nm | 3 | 1 | 1 |

From the results in Table 1, it has been revealed that, when the oxidation-preventive protective layer is provided between the oxide layer and the reflective layer in a state in which the adhesion layer formed of zirconium oxide or hafnium oxide (translucent adhesion layer) is interposed between the oxidation-preventive protective layer and the reflective layer, a reflectance equal to or higher than that in the case where the oxidation-preventive protective layer and the adhesive layer are not provided can be obtained. Further, it has been revealed that extremely favorable adhesiveness (durability of adhesiveness) and luminous flux maintenance ratio are obtained as in the case where a titanium layer is provided as the adhesion layer.

In the fluorescent plate in which the oxide layer is provided between the fluorescent material layer and the reflective layer, it has been revealed that, when the oxidation-preventive protective layer is provided between the oxide layer and the reflective layer in a state in which the translucent adhesion layer is interposed between the oxidation-preventive protective layer and the reflective layer, a high reflectance can be maintained for a long period of time without occurrence of peeling off the reflective layer formed of silver. In addition, it was confirmed that a higher reflectance was obtained by making the translucent adhesion layer have a thickness of 5 to 10 nm.

35B second constitution layer
36 translucent adhesion layer
37 second oxide layer
41 sealing layer
42 adhesive layer

The invention claimed is:

1. A fluorescent plate including a fluorescent material layer containing a fluorescent material, an oxide layer disposed below the fluorescent material layer, and a reflective layer which is disposed below the oxide layer and is formed of silver, the fluorescent plate comprising:
    an oxidation-preventive protective layer which is disposed between the oxide layer and the reflective layer and is formed of a translucent material; and
    a translucent adhesion layer interposed between the oxidation-preventive protective layer and the reflective layer.

2. The fluorescent plate according to claim 1, wherein the translucent material constituting the oxidation-preventive protective layer is formed of any of a fluoride and a nitride.

3. The fluorescent plate according to claim 1, wherein the translucent adhesion layer is formed of at least one of hafnium oxide and zirconium oxide.

4. The fluorescent plate according to claim 2, wherein the translucent adhesion layer is formed of at least one of hafnium oxide and zirconium oxide.

5. The fluorescent plate according to claim 1, wherein the translucent adhesion layer has a thickness of 5 to 10 nm.

6. The fluorescent plate according to claim 2, wherein the translucent adhesion layer has a thickness of 5 to 10 nm.

7. The fluorescent plate according to claim 3, wherein the translucent adhesion layer has a thickness of 5 to 10 nm.

8. The fluorescent plate according to claim 1, wherein the oxide layer is composed of at least any one of an oxide monolayer film formed of alumina and an oxide multilayer film composed of a first constitution layer formed of silicon dioxide and a second constitution layer formed of titania.

9. The fluorescent plate according to claim 2, wherein the oxide layer is composed of at least any one of an oxide monolayer film formed of alumina and an oxide multilayer film composed of a first constitution layer formed of silicon dioxide and a second constitution layer formed of titania.

10. The fluorescent plate according to claim 3, wherein the oxide layer is composed of at least any one of an oxide monolayer film formed of alumina and an oxide multilayer film composed of a first constitution layer formed of silicon dioxide and a second constitution layer formed of titania.

11. The fluorescent plate according to claim 4, wherein the oxide layer is composed of at least any one of an oxide monolayer film formed of alumina and an oxide multilayer film composed of a first constitution layer formed of silicon dioxide and a second constitution layer formed of titania.

12. The fluorescent plate according to claim 1, further comprising an oxygen atom-free layer which is disposed below the reflective layer and is formed of an oxygen atom-free material containing no oxygen atom.

13. The fluorescent plate according to claim 2, further comprising an oxygen atom-free layer which is disposed below the reflective layer and is formed of an oxygen atom-free material containing no oxygen atom.

14. The fluorescent plate according to claim 3, further comprising an oxygen atom-free layer which is disposed below the reflective layer and is formed of an oxygen atom-free material containing no oxygen atom.

15. The fluorescent plate according to claim 4, further comprising an oxygen atom-free layer which is disposed below the reflective layer and is formed of an oxygen atom-free material containing no oxygen atom.

16. The fluorescent plate according to claim 5, further comprising an oxygen atom-free layer which is disposed below the reflective layer and is formed of an oxygen atom-free material containing no oxygen atom.

17. The fluorescent plate according to claim 12, wherein the oxygen atom-free material comprises any material selected from the group consisting of magnesium fluoride, silicon nitride, aluminum nitride, aluminum, chromium and nickel.

* * * * *